Patented Nov. 22, 1927.

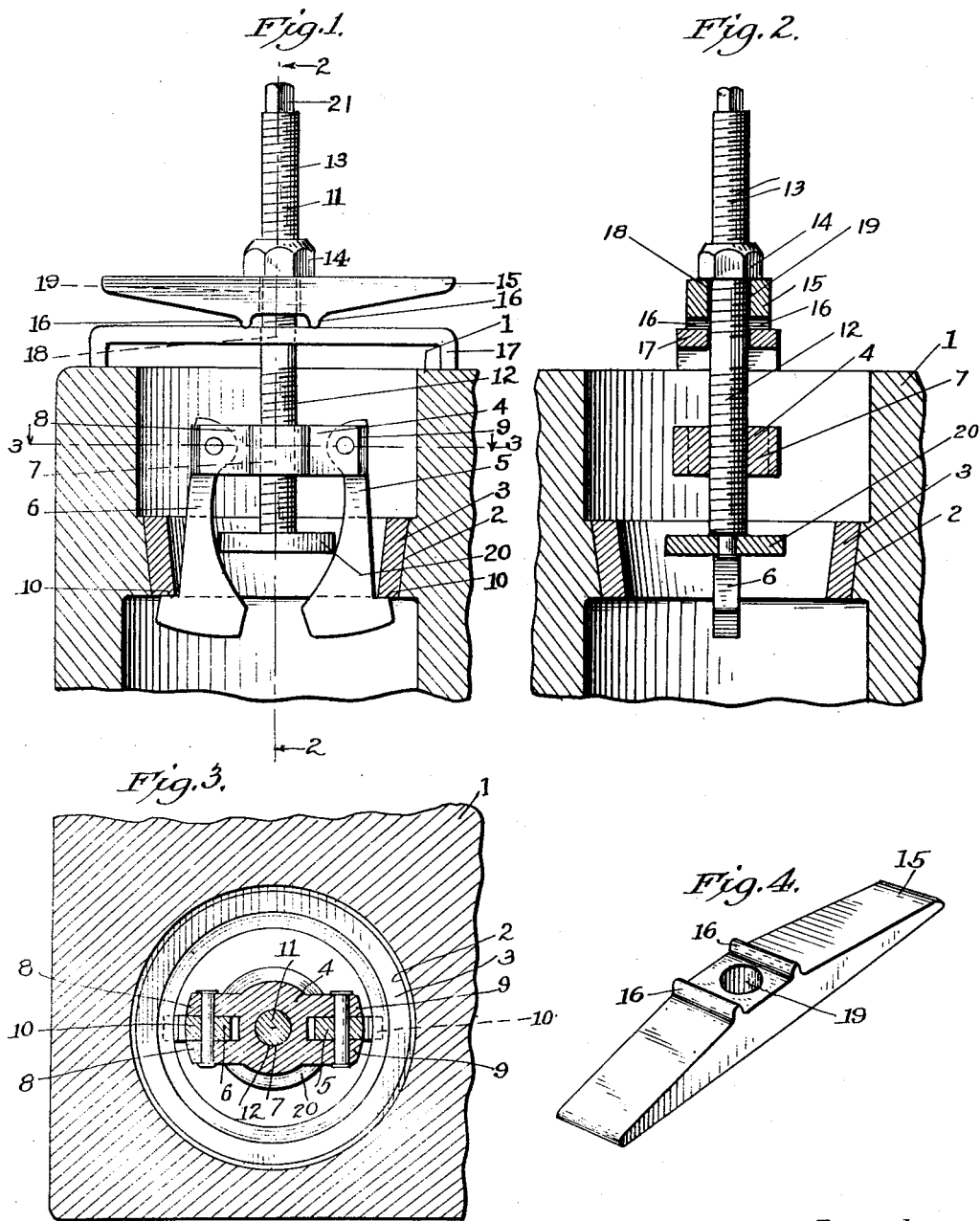

1,650,024

UNITED STATES PATENT OFFICE.

RAYMOND F. MAXWELL, OF LONG BEACH, CALIFORNIA, ASSIGNOR OF ONE-HALF TO CHESTER C. HOSMER, OF HUNTINGTON BEACH, CALIFORNIA.

VALVE-SEAT AND LINER PULLER.

Application filed December 13, 1926. Serial No. 154,531.

This invention relates to liner pullers and especially to devices for removing pump liners, bushinngs, valve seats, bearing races and other ring-like members from the machines or devices on which they are used, the same being shown herein and described as applied to a lining for a pump. When pumps are used for material containing sand, grit or other abrading material, as in oil wells, the wear upon the walls is so rapid as to speedily render the pumps unfit for service unless the surfaces of the walls are renewed frequently. This renewal is made possible by the use of liners which fit into the cylinders so tightly as to require considerable effort to remove them especially after they have been in use for a considerable length tof time.

It is an object of this invention to improve upon the device shown in my co-pending application, Serial No. 100,051 filed April 6, 1926, and upon the devices heretofore employed for the purposes stated, and to do so in such a way as to produce a puller which in structure is simple and durable and which in operation is efficient.

With the foregoing and other objects in view which will be made manifest in the following detailed description and specifically pointed out in the appended claims, reference is had to the accompanying drawings for an illustrative embodiment of the invention, wherein:

Figure 1 is a side elevation showing a portion of a pump and valve seat in section and my liner puller in position thereon, Fig. 2 is a sectional view taken along the line 2—2 of Fig. 1, Fig. 3 is a similar section taken along the line 3—3 of Fig. 1, and Fig. 4 is a perspective view of a rocker piece employed in connection with my invention.

Referring to the accompanying drawings wherein similar reference characters designate similar parts throughout, a portion of the pump shown in section in Figs. 1, 2 and 3 is designated by the reference number 1. A valve seat shown at 2 has therein a liner 3 which is desired to be removed from the seat for replacement. This liner is circular in form and closely adheres to the walls of the valve seat 2. The elements 4, 5 and 6 form a mechanism in the nature of a spider in which there is a ringlike threaded portion 7 from which project opposite pairs of lugs 8 and 9. Between the lugs 9 there is pivoted the upper end of a gripping dog 5 and a similar but reversely turned dog 6 is pivoted between the lugs 8. At the lower part of their side edges the dogs are provided with outwardly projecting shoulders 10 for a purpose hereinafter described.

Extending through the member 7 is an operating screw or bolt 11 having a square portion 21 on its upper end. The screw or bolt 11 has a threaded portion 12 in engagement with the threads of the member 7 and a threaded portion 13 adjacent its upper end. A nut is shown at 14 which screws upon the threaded portion 13, this nut bearing upon a rocker piece 15, which piece has downwardly extending projections 16 which bear upon a bridge member 17. The bridge member 17 is provided with an enlarged aperture 18 and the rocker piece 15 is similarly provided with an enlarged aperture 19, through which apertures the operating screw 11 loosely extends. On the lower end of this operating screw is provided a disc 20 which is adapted to bear against the dogs 5 and 6 and expand the same.

The operation of my device is as follows: Before inserting the gripping dogs into the cylinder, the operating screw 11 is turned until the disc 20 permits the lower ends of the dogs to swing together. The device is then inserted into the cylinder below the valve liner 9 shown in Fig. 1, and the operating screw 11 is turned again in the opposite direction until the disc 20 bears against the curved surfaces of the dog and expands the same into contact with the lower portion of the liner. At this point the bridge 17 with the rocker piece 15 resting on it is placed in position on the cylinder. The nut 14 is then tightened down on the rocker piece until considerable upward pull is placed on the liner 3. Generally the liners pull with comparative ease after they have once been started and broken away from their initial positions. Very often the liner will be broken from its position merely by tightening the nut 14 against the rocker piece. However, at times the liner will show no inclination to break from its position and at such times a sharp blow on the outer ends of the rocker piece 15 will serve to make this break, after which the nut 14 may be turned and the liner will tend to move upwardly.

The term "liner" is used in the appended claims in a descriptive and not in a limited sense, it being understood that the invention may be employed for pulling devices other than liners as previously stated.

It will be understood that various changes may be made in the detail of construction without departing from the spirit and scope of the invention as defined by the appended claims.

I claim:

1. A liner puller having in combination a gripping element adapted to grip a liner or the like, a pulling bolt operatively connected to said gripping element, a bridge and rocker piece through which the bolt loosely extends, and a nut threaded onto the bolt and bearing on the rocker piece as and for the purpose specified.

2. A liner puller having in combination a plurality of gripping dogs adapted to grip a liner or the like, a pulling bolt operatively connected to said dogs, a bridge and a rocker piece through which the bolt loosely extends, a nut threaded onto the bolt and bearing on the rocker piece, and means actuated by the nut to withdraw the gripping dogs and liner.

3. A liner puller comprising in combination a spider, a plurality of gripping dogs pivotally connected thereto, a bolt threaded through the spider having a disc thereon engaging said gripping dogs to expand the same, a bridge and rocker piece through which the bolt loosely extends, and a nut threaded onto said bolt and adapted to bear upon said rocker piece whereby the gripping dogs may be withdrawn.

4. Means for withdrawing a liner from its seat comprising a gripping element, an operating bolt associated with said gripping element, a bridge and rocker piece through which said bolt is adapted to extend, said bolt having a nut threaded thereon said nut bearing against said rocker piece, whereby said gripping means may be withdrawn.

5. A liner puller comprising in combination a spider having a plurality of gripping dogs pivotally connected thereto, said gripping dogs being adapted to engage a liner, a bridge, an operating bolt threaded through said spider, and loosely extending through said bridge, and means on said bridge adapted to be struck by a hammer whereby said gripping dogs and said liner may be removed.

In testimony whereof I have signed my name to this specification.

RAYMOND F. MAXWELL.